United States Patent [19]
Miller

[11] 3,820,885
[45] June 28, 1974

[54] T. V. PROJECT-O-SCOPE
[76] Inventor: Bennie S. Miller, 536 N. Cave St., Princeton, Ky. 42445
[22] Filed: May 2, 1973
[21] Appl. No.: 356,593

[52] U.S. Cl. ................................. 353/98, 353/122
[51] Int. Cl. ......................................... G03b 21/28
[58] Field of Search .................. 353/98, 99, 74–78, 353/122

[56] References Cited
UNITED STATES PATENTS
| | | | |
|---|---|---|---|
| 2,306,407 | 12/1942 | Rosenthal | 353/122 |
| 2,307,211 | 1/1943 | Goldsmith | 353/98 |
| 3,115,544 | 12/1963 | Marley | 353/78 |
| 3,342,101 | 9/1967 | Zollmer | 353/66 |

*Primary Examiner*—Louis R. Prince
*Assistant Examiner*—A. Jason Mirabito

[57] ABSTRACT

A device for making viewing of a small screen television set more enjoyable and comfortable for an entire family or large number of persons; the device consisting of a unit that supports an angularly positioned mirror in front of a television set screen so that the picture image projected from the T.V. set on the mirror is then passed through lens and reflected on a larger screen some distance away in order that the picture image is enlarged for easier viewing by many at one time.

1 Claim, 4 Drawing Figures

PATENTED JUN 28 1974 3,820,885
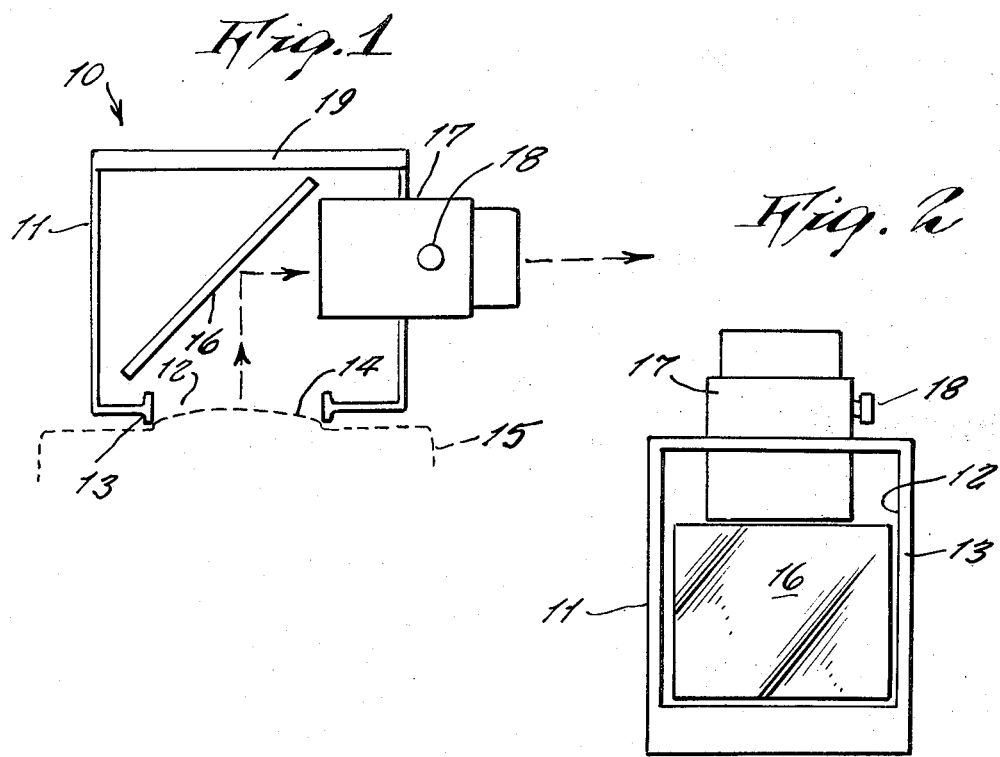
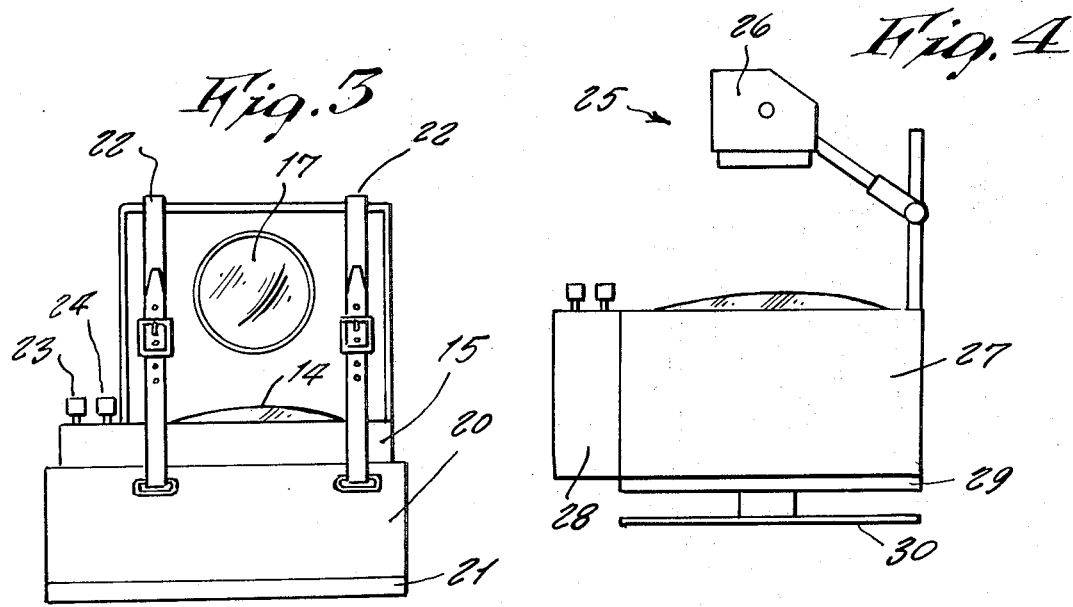

T. V. PROJECT-O-SCOPE

This invention relates generally to accessories for television receiver sets. More specifically it relates to projectors.

It is well known that at times it is difficult for a large family or a group of friends to view a television program received on a small T.V. set, because they all cannot be close enough to the screen. This is an objectionable situation, and therefore in want of an improvement.

Accordingly, it is a principal object of the present invention to provide a T.V. project-o-scope that enlarges the T.V. picture image so it can easily be viewed by a large group.

Another object is to provide a T.V. project-o-scope that is adaptable for either black and white or color T.V. programs.

Yet another object is to provide a T.V. project-o-scope that is ideal for use at a party for entertaining a group of guests, or which would be ideal in a classroom for T.V. program teaching to a large class.

Other objects are to provide a T.V. project-o-scope which is simple in design, inexpensive to manufacture, rugged in construction, easy to use, and efficient in operation.

These and other objects will be readily evident upon a study of the following specification and the accompanying drawing, wherein:

FIG. 1 is a side view of one design of the present invention.

FIG. 2 is a bottom view thereof.

FIG. 3 is a front view thereof secured to a T.V. set.

FIG. 4 is a side view of a modified design of the invention, wherein an overhead projector is converted to a T.V. projector.

Referring now to the drawing in detail, and more particularly to FIGS. 1 to 3 thereof at this time, the reference numeral 10 represents a T.V. project-o-scope according to the present invention, wherein there is a hollow housing 11 having an opening 12 at its bottom and which is framed with foam rubber 13 so it snugly fits a T.V. screen 14 of a T.V. receiver set 15 that is positioned so that the screen 14 faces upwardly; the housing 11 accordingly being on top of the T.V. set. Within the interior of the housing there is a diagonally inclined mirror 16 made of plate glass so that an undistorted and very clear picture image is projected on the mirror from the T.V. screen. A lens barrel combination or a more sophisticated retractable lens unit 17 is mounted through a front side of the housing so that a picture image reflected from the mirror is passed horizontally outwardly therethrough for being projected upon an externally located large movie screen or the like where the enlarged picture image can now be comfortably seen by many viewers. A lens adjustment 18 on the unit 17 provides for focusing a sharp image.

A removable top cover 19 allows access to the housing interior.

As shown in FIG. 3, the T.V. set 15 is placed in a basket 20 that has a foam rubber pad 21 on its bottom. A pair of adjustable straps 22 secure the T.V. set in the basket. The T.V. control knobs 23 and 24 are readily accessible for operation of the set.

In FIG. 4 there is shown an overhead projector 25 that is converted into a T.V. projector, and includes a lens system 26. A housing 27 is provided for a T.V. set 28, the housing having foam rubber 29 on its bottom, and the housing position being adjusted by an adjustable stage or elevator 30.

Thus a novel T.V. project-o-scope has been presented.

I claim:

1. In a T.V. project-o-scope, the combination of a hollow housing placeable over a screen of a TV set, an inclined mirror within said housing, and a lens unit through said housing for projecting a picture image of said TV set screen upon an externally located large movie screen so that many persons can easily view said image, said TV set being in a basket having a rubber pad bottom, and said TV set being secured to said housing by a pair of adjustable straps attachable to said basket and passed around the outer side of said housing so to additionally secure said housing on said TV set in a proper operative position.

* * * * *